United States Patent
Hoffman et al.

(10) Patent No.: US 11,662,429 B2
(45) Date of Patent: May 30, 2023

(54) SYSTEMS, DEVICES AND METHODS OF TRANSMISSION LINE CALIBRATION FOR ANTENNA ARRAY SYSTEMS

(71) Applicant: VAYYAR IMAGING LTD., Yehud (IL)

(72) Inventors: Damian Hoffman, Kfar Saba (IL); Mark Popov, Ramat Gan (IL)

(73) Assignee: VAYYAR IMAGING LTD, Yehud (IL)

( * ) Notice: Subject to any disclaimer, the term of this patent is extended or adjusted under 35 U.S.C. 154(b) by 131 days.

(21) Appl. No.: 17/074,312

(22) Filed: Oct. 19, 2020

(65) Prior Publication Data
US 2021/0190909 A1 Jun. 24, 2021

(30) Foreign Application Priority Data
Dec. 23, 2019 (IL) .......................................... 271668

(51) Int. Cl.
*G01S 7/40* (2006.01)
*H01Q 3/26* (2006.01)

(52) U.S. Cl.
CPC .............. *G01S 7/40* (2013.01); *G01S 7/4021* (2013.01); *H01Q 3/267* (2013.01); *H01Q 3/2694* (2013.01)

(58) Field of Classification Search
CPC .......... G01S 7/032; G01S 7/40; G01S 7/4021; G01S 7/4065; H01Q 21/0075; H01Q 3/267; H01Q 3/2694
See application file for complete search history.

(56) References Cited

U.S. PATENT DOCUMENTS

| | | | |
|---|---|---|---|
| 10,498,392 B2 | 12/2019 | Caruso et al. | |
| 2012/0280856 A1* | 11/2012 | Oswald | G01S 7/032 342/174 |
| 2013/0060501 A1* | 3/2013 | Huang | G01R 35/005 702/106 |
| 2016/0363646 A1 | 12/2016 | Holzmann et al. | |
| 2016/0380711 A1 | 12/2016 | Feigin et al. | |
| 2017/0310404 A1* | 10/2017 | Xiao | H04B 3/48 |
| 2018/0088382 A1 | 3/2018 | Bai et al. | |
| 2018/0316092 A1* | 11/2018 | Cai | H04B 17/0085 |
| 2020/0014105 A1* | 1/2020 | Braun | H01Q 3/267 |

OTHER PUBLICATIONS

European Search Report of corresponding European Appln. No. EU20216596 dated May 4, 2021.
Israel Search Report of corresponding Israel Application No. 271668 dated May 26, 2020.

\* cited by examiner

*Primary Examiner* — Timothy X Pham
(74) *Attorney, Agent, or Firm* — Browdy and Neimark, PLLC

(57) ABSTRACT

There are provided methods and systems configured to perform calibration of antenna array systems, for example during production, avoiding the use of external setups or external measurements. The method comprising: (i) measuring the delay of a dedicated calibration transmission line for each SUT, for example during production, using internal built-in system capabilities; (ii) comparing the measured delay to a known delay of an identical transmission line of a reference system; (iii) computing, based on this comparison, compensation values with respect to the reference system of delay (or phase), for all transmission lines of the SUT; (iv) calibrating the SUT using the computed compensation values for all transmission lines of the SUT.

16 Claims, 6 Drawing Sheets

SYSTEMS, DEVICES AND METHODS OF TRANSMISSION LINE CALIBRATION FOR ANTENNA ARRAY SYSTEMS

CROSS-REFERENCE

The present application claims the benefit of Israeli Application Ser. No. 271668, filed on Dec. 23, 2019, entitled "SYSTEMS, DEVICES AND METHODS OF TRANSMISSION LINE CALIBRATION FOR ANTENNA ARRY SYSTEMS", the entire disclosures of which are incorporated herein by reference.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The present invention relates to the calibration of antenna array systems implemented, for example, on printed circuit boards. In particular, the present invention relates to methods and systems for compensating delay changes of transmission lines of the antenna array systems.

BACKGROUND OF THE INVENTION

Antenna array systems require precise calibration of the components of the array in order to achieve accurate beamforming results. Specifically, the multiple transmitted or the received signals to or from the antenna elements should incur the same delay, or equivalently should be phased matched between themselves. The phase matching depends for example, on the antenna elements, on the transmit and receive electronic circuitry, and on the delay of the transmission lines distributing the signals to and from the antenna elements. The delay of the transmission lines is prone to change from its design value, especially when implemented as printed circuit traces in printed circuit board (PCB) technology (for example microstrip, stripline, coplanar waveguide, etc.). The delay changes may happen due to change in dielectric substrate properties batch-to-batch production or over temperature; change in registration between layers, their thickness etc. This concern applies to both monostatic antenna arrays, in which all antenna elements may transmit or receive, and to bi-static arrays, in which some of the antenna elements transmit and other receive, as it happens, for example, with Multiple-input multiple-output (MIMO) radars.

As a result, a calibration, performed during production is required for all or most units. This calibration should take into account the delay change of the transmission lines, the possible mismatch between the antennas and the electronic circuitry, and also the possible mismatch between the antennas and a medium the antennas are radiating into. This calibration is complex, time consuming and costly process requiring accurate calibration equipment.

FIG. 1 shows schematically an example of a system under test (hereinafter "SUT") such as a bi-static antenna array system 100 implemented on a PCB 101, in accordance with the prior art. The antenna array system 100 is configured to transmit and receive respectively one or more signals, for example signals 131 and 132 to/from an electromagnetic target 130. The bi-static antenna array system 100 comprises antenna elements such as transmit antenna array 120 and receive antenna array 121 connected via transmission line printed circuit traces 140 to a Tx/Rx circuitry sub-unit such as an RFIC (Radio Frequency Integrated Circuit) 110.

Calibration According to the Prior Art

The calibration of an antenna array system can be performed by mounting the system to be calibrated in a fixture and providing a reflecting target at a known distance from it. Typically, the calibration target is an electromagnetic reflecting mirror but other objects can be used. The distance to the target should be known with an accuracy of a small fraction of operational wavelength. For example, for a 30 GHz signal (wavelength=1 cm) the accuracy of 1% is 100 micron.

FIG. 2 shows schematically a calibration fixture 200, according to the prior art. The antenna system 210 to be calibrated is placed on a fixture base 201 and may transmit/receive towards/from an electromagnetic reflecting mirror target 230. The lateral 205 and vertical 206 positions of the target 230 are adjustable and are known with great accuracy (e.g. 100 microns).

For example, to calibrate a bi-static antenna array system, such as the bi-static antenna array 100, the system is mounted on fixture 200 and appropriate signals are transmitted and received. The transfer function $S(x_i, x_j)$ for a transmitted signal out of transmitter i=1 . . . M, and received by receiver j, j=1 . . . N is measured for each pair (i,j) according to Eq (1):

$$S(x_i, x_j) = H_T(x_i) H_{Target}(x_i, x_j) H_R(x_j) \quad (1)$$

where:
$H_T(X_i)$ is the transfer function of the path from transmitter i to transmit antenna i,
$H_R(x_j)$ is the transfer function from receive antenna j to receiver j, and
$H_{Target}(x_i, x_j)$ is the electromagnetic medium response due to transmission from antenna i, reflection/scattering from the calibration target and reception by antenna j.

$$H_T(x_i) \sim e^{\frac{2\pi i}{\lambda} L_{Electrical}(x_i)}$$

$$H_R(x_j) \sim e^{\frac{2\pi i}{\lambda} L_{Electrical}(x_j)}$$

where:
$L_{Electrical}(\bullet)$ is the electrical length the transmit (receive) signal which propagates from the transmitter (receiver) port to the transmit (receive) antenna, and $$\lambda = \frac{c}{f}$$

is the signal wavelength (c—speed of light and f—signal frequency).
Thus, $S(x_i, x_j)$ is proportional to:

$$S(x_i, x_j) \sim e^{\frac{2\pi i}{\lambda} L_{Electrical}(x_i)} H_{Target}(x_i, x_j) e^{\frac{2\pi i}{\lambda} L_{Electrical}(x_j)} = \\ e^{\frac{2\pi i}{\lambda}[L_{Electrical}(x_i) + L_{Electrical}(x_j)]} H_{Target}(x_i, x_j) \quad (2)$$

This measurement can be used to evaluate for all transmit-receive pairs (i,j), i=1 . . . M, j=1 . . . N the phase, delay or electrical length:

phase:

$$\phi(i, j) = \frac{2\pi}{\lambda}(L_{Electric}(x_i) + L_{Electric}(x_j)) \bmod 2\pi \quad (3)$$

delay:

$$\tau(i, j) = \frac{1}{2\pi f}\phi(i, j) \quad (4)$$

electrical length:

$$(L_{Electric}(x_i) + L_{Electric}(x_j)) = \frac{\lambda}{2\pi}\phi(i, j) = c * \tau(i, j) \quad (5)$$

Thus, the calibration for a bi-static array system, includes using the evaluated phases ϕ(i,j), or equivalently the delays τ(i,j), to match or equalize the total phase or delay for all transmit-receive pairs (i,j), as part of processing the received signals.

For example, delay equalization/matching means that the delays for all (i,j) transmit-receive pairs should be the same, e.g. equal to an arbitrary value $$T \geq \max_{i,j} \tau(i, j).$$

Thus, a compensation delay of σ(i,j)=T−τ(i,j) is used for each transmit-receive pair (i,j), as part of processing the received signals.

In a similar way, phase equalization/matching means that for all (i,j) transmit-receive pairs the phases should be the same, e.g. equal to an arbitrary value Φ. Thus, a compensation phase of θ(i,j)=(Φ−ϕ(i,j))mod 2π is used for each transmit-receive pair (i,j), as part of processing the received signals.

A system and method to calibrate a bi-static array system is described in US patent application number US2019/0025403A1 entitled "System and methods for calibrating an antenna array using targets" which is incorporated herein by reference.

The transmission line electrical length, its delay or phase shift, may change due to changes in the PCB dielectric substrate properties and/or layer registration and/or layer thickness, etc., from one production batch to another, and sometime within the same production batch. If no changes occur within a production batch, it would be sufficient to establish a baseline by performing the calibration process as explained above on a representative system (e.g. "reference system") for each production batch and calibrate all the systems of the same production batch by applying the evaluated delays (or phase shifts) of the reference system. However, in many cases, the delay (phase shift) constancy cannot be guaranteed within the production batch, thus as to prior art, a calibration process as detailed above should be performed for all or most systems in production. Performing multiple calibrations is a long process requiring accurate setups which sometimes may not be available in a mass production environment. Additionally, the manufacturing cost required for multiple calibrations is significantly high.

Moreover, delay (phase shift) changes may occur also in field service, during the lifetime of the product, for example due to environmental changes, aging, etc. However, the prior art calibration provides a solution only at the factory as part of the production process and does not provide a solution to changes occurring in field service.

SUMMARY OF THE INVENTION

According to an aspect of some embodiments, there are provided methods and systems configured to perform calibration of antenna array systems, for example during production, avoiding the use of external setups or external measurements.

According to one embodiment, there is provided a method comprising: (i) measuring the delay of a dedicated calibration transmission line for each SUT, for example during production, using internal built-in system capabilities; (ii) comparing the measured delay to a known delay of an identical transmission line of a reference system; (iii) computing, based on this comparison, compensation values with respect to the reference system of delay (or phase), for all transmission lines of the SUT; (iv) calibrating the SUT using the computed compensation values for all transmission lines of the SUT. Advantageously, with the exception of the setup and a one-time calibration of a single system (e.g. reference system), its calibration results used as a baseline for all production systems, the present invention method does not require any external setups or external measurements and can be easily incorporated in a mass production process as part of a calibration and testing procedure.

In another embodiment, on-going re-calibration of the system can be performed (for example, in field service, whenever changes in the delay may have occurred) by measuring the delay of the dedicated calibration transmission line using the internal built-in system capabilities, computing the required compensation values for all transmission lines and applying them accordingly.

According to one embodiment, there is provided an antenna array system comprising: a plurality of transmission lines; a plurality of transmitters; a plurality of transmit antenna elements, wherein each antenna element of said plurality of transmit antenna elements is connected, respectively, via one transmission line of said plurality of transmission lines to one of said plurality of transmitters; a plurality of receivers; a plurality of receive antenna elements, wherein each receive antenna element of said receive antenna elements is connected, respectively, via one transmission line of said plurality of transmission lines to one receiver of said plurality of receivers; at least one dedicated transmitter connected to at least one dedicated receiver via a dedicated calibration transmission line; and at least one processor in communication with said plurality of transmitters and with said plurality of receivers said processor is configured to: obtain a delay value of a dedicated calibration transmission line of a reference antenna array system; measure the delay value of the dedicated calibration transmission line of the reference antenna array system; evaluate a delay change value Δdelay($x_{cal}$) by subtracting the delay value of the dedicated calibration transmission line of the reference antenna array system from the delay of the dedicated calibration transmission line of the antenna array system; calculate compensation values for cancelling the incurring electrical length change of each pair (i,j) of transmit-receive transmission lines of the antenna array system wherein the calculation is based on the evaluated delay change $\Delta\text{delay}(x_{cal})$; and calibrate the antenna array system using the calculated compensation values.

In an embodiment, the compensation values comprise compensation phases.

In an embodiment, the compensation values comprise compensation delays.

In an embodiment, the delay change value $\Delta\text{delay}(x_{cal})$ of the dedicated transmission line is represented as a change in electrical length of the dedicated calibration transmission line $\Delta L_{Electrical}(x_{cal})$ of the antenna array system.

In an embodiment, the calculation of the compensation values is based on the electrical length change of the dedicated calibration transmission line $\Delta L_{Electrical}(x_{cal})$ of the antenna array system.

In an embodiment, the plurality of transmission lines are printed traces on a printed circuit board (PCB).

In an embodiment, the plurality of transmission lines are selected from the group consisting of: microstrips, striplines, coplanar waveguides.

In an embodiment, the delay value of the dedicated calibration transmission line is measured by processing a signal received at said at least one dedicated receiver, wherein said signal is transmitted by said at least one dedicated transmitter.

In an embodiment, the signal is a wideband signal.

In an embodiment, the signal is a short pulse signal.

In an embodiment, the antenna array system is a bi-static multi-antenna array system.

According to another embodiment, there is provided an antenna array system, comprising: a plurality of transmission lines; a plurality of transmitters; a plurality of transmit antenna elements, wherein each antenna element of said plurality of transmit antenna elements is connected, respectively, via one transmission line of said plurality of transmission lines to one transmitter of said plurality of transmitters; a plurality of receivers;

a plurality of receive antenna elements, wherein each antenna element of said plurality of receive antenna elements is connected, respectively, via one transmission line of said plurality of transmission lines to one receiver of said plurality of receivers; and at least one dedicated transmitter connected to at least one dedicated receiver via a dedicated calibration transmission line; and a processor in communication with said plurality of transmitters and with said plurality of receivers configured to measure the electrical length of said dedicated calibration transmission line, said electrical length is used to compensate for changes in the electrical length of said plurality of transmission lines.

In an embodiment, the plurality of transmission lines are printed traces on a printed circuit board (PCB).

In an embodiment, the plurality of transmission lines are selected from the group consisting of: microstrips, striplines, coplanar waveguides.

In an embodiment, the electrical length of said dedicated calibration transmission line is measured by processing a signal received at said dedicated receiver, wherein said signal is transmitted by said dedicated transmitter and wherein said processing comprises measuring a propagation delay of said signal through said dedicated calibration transmission line.

In an embodiment, the signal is a wideband signal.

In an embodiment, the signal is a short pulse signal.

In an embodiment, the antenna array system is a bi-static multi-antenna array system.

According to another embodiment there is provided a method for calibrating an antenna array system using a reference antenna array system, the antenna array system comprising: a plurality of transmission lines; a plurality of transmitters; a plurality of transmit antenna elements, wherein each antenna element of said plurality of transmit antenna elements is connected, respectively, via one transmission line of said plurality of transmission lines to one transmitter of said plurality of transmitters; a plurality of receivers; a plurality of receive antenna elements, wherein each antenna element of said receive antenna elements is connected, respectively, via one transmission line of said plurality of transmission lines to one receiver of said plurality of receivers; and at least one dedicated transmitter connected to at least one dedicated receiver via a dedicated calibration transmission line; the method comprising: obtaining a delay value of a dedicated calibration transmission line of the reference antenna array system; measuring the delay value of the dedicated calibration transmission line of the antenna array system; evaluating a delay change value $\Delta\text{delay}(x_{cal})$ of the dedicated calibration transmission line by subtracting the delay value of the dedicated calibration transmission line of the reference antenna array system from the delay value of the dedicated calibration transmission line of the antenna array system; calculating compensation values for cancelling the incurring electrical length change of each pair (i,j) of transmit-receive transmission lines of the antenna array system wherein the calculation is based on the evaluated delay change of the dedicated calibration transmission line $\Delta\text{delay}(x_{cal})$; and calibrating the antenna array system using the calculated compensation values.

In an embodiment, the compensation values comprise compensation phases.

In an embodiment, the compensation values comprise compensation delays.

In an embodiment, the delay change of the dedicated transmission line is represented as a change in electrical length of the dedicated calibration transmission line $\Delta L_{Electrical}(x_{cal})$.

In an embodiment, the calculation of the compensation values is based on the electrical length change of the dedicated calibration transmission line $\Delta L_{Electrical}(x_{cal})$.

DETAILED DESCRIPTION OF THE INVENTION

Figure 1:
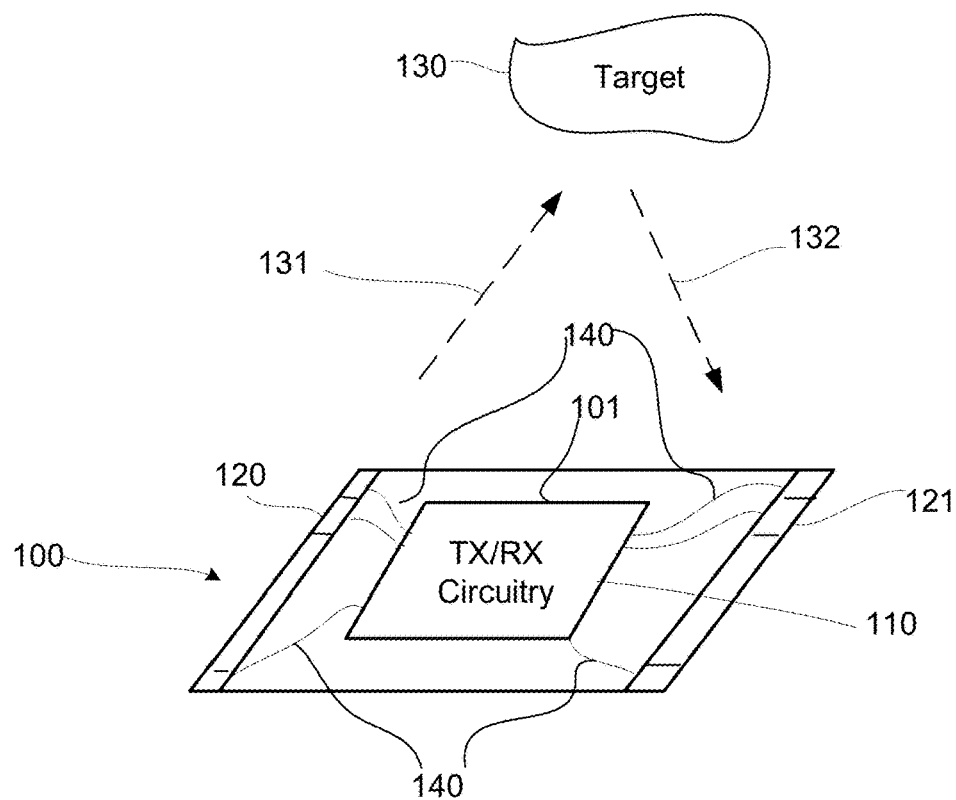
FIG. 1 shows, schematically, a bi-static antenna system and an electromagnetic target reflecting the transmissions from the bi-static antenna system, according to the prior art.
Figure 2:
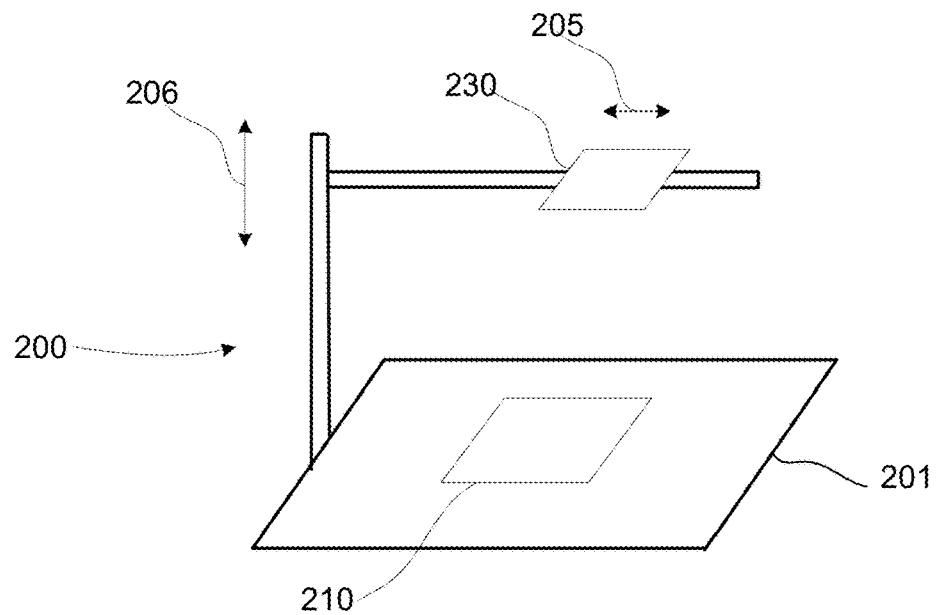
FIG. 2 shows, schematically, a calibration fixture on which the system to be calibrated is mounted on and an electromagnetic reflecting target with adjustable vertical and lateral positions, according to prior art.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

A better understanding of the features and advantages of the present disclosure will be obtained by reference to the following detailed description that sets forth illustrative embodiments, in which the principles of embodiments of the present disclosure are utilized, and the accompanying drawings.

The configurations disclosed herein can be combined in one or more of many ways to provide methods and systems configured to perform calibration of antenna array systems, for example during production, avoiding the use of external setups or external measurements.

In accordance with embodiments, there are provided methods and systems for calibrating antenna array systems, for example during production, and advantageously avoiding the use of external setups or external measurements.

According to one embodiment, there is provided a method comprising: (i) measuring the delay of a dedicated calibration transmission line for each SUT, for example during production, including using internal built-in system capabilities; (ii) comparing the measured delay to a known delay of an identical transmission line of a reference system; (iii) computing, based on this comparison, compensation values with respect to the reference system of delay (or phase) for all transmission lines of the SUT; (iv) calibrating the SUT using the computed compensation values for all transmission lines of the SUT. Advantageously, with the exception of the setup and a one-time calibration of a single system (e.g. reference system), its calibration results used as a baseline for all production systems, the present invention method does not require any external setups or external measurements, and can be easily incorporated in a mass production process as part of a calibration and testing procedure.

In another embodiment, on-going re-calibration of the system can be performed (for example in field service, whenever changes in the delay may have occurred) by measuring the delay of the dedicated calibration transmission line using the internal built-in system capabilities, computing the required compensation for all transmission lines and applying them accordingly.

In accordance with embodiments, there are provided methods and systems configured to perform calibration of antenna array systems, for example during production, avoiding the use of external setups or external measurements.

In some cases, the systems may be SUT such as antenna devices or systems.

In some cases, the SUT may be or may include one or more bi-static antenna systems.

In some embodiments, there are provided systems and methods for compensating electrical length change of the transmission lines (equivalently delay or phase change) due to changes in dielectric properties of PCB. It is assumed that the PCB substrate material has a uniform dielectric constant.

As used herein, like characters refer to like elements.
System Description

According to some embodiments, the antenna array system is a bi-static antenna system, which may include two antenna arrays, such as two distinct antenna arrays, one antenna array for transmitting signals and the other antenna array for receiving the signals. The bi-static antenna system may further comprise an electronic circuitry comprising a multi-channel transmitter and a multi-channel receiver. In accordance with configurations, each channel (e.g. transmit or receive) of the electronic circuitry is connected to its appropriate antenna. According to some embodiments, the electronic circuitry may also comprise one or more processors configured and enabled to perform various signal processing, control and monitoring functions, such as delay measurement and computation of compensation values for calibration.

In some cases, the transmitted signals can be identical for all channels up to phase shifts/time delay thus implementing a phase array or can differ for implementing multi-channel transmission.

In accordance with embodiments, the transmitted signals may be radiated by the transmit antenna array as a composite electro-magnetic wave. This wave may be reflected/scattered by various targets and received by the multi-channel receiver via the receive antenna array. The received signal may be processed, for example by the one or more processors, to extract the appropriate information. In some cases, the processing can be identical or different for each receiver.

In some embodiments, the multi-channel transmit and receive circuitry is implemented an RFIC, which may include also processing, control and monitoring functions.

Figure 3A:
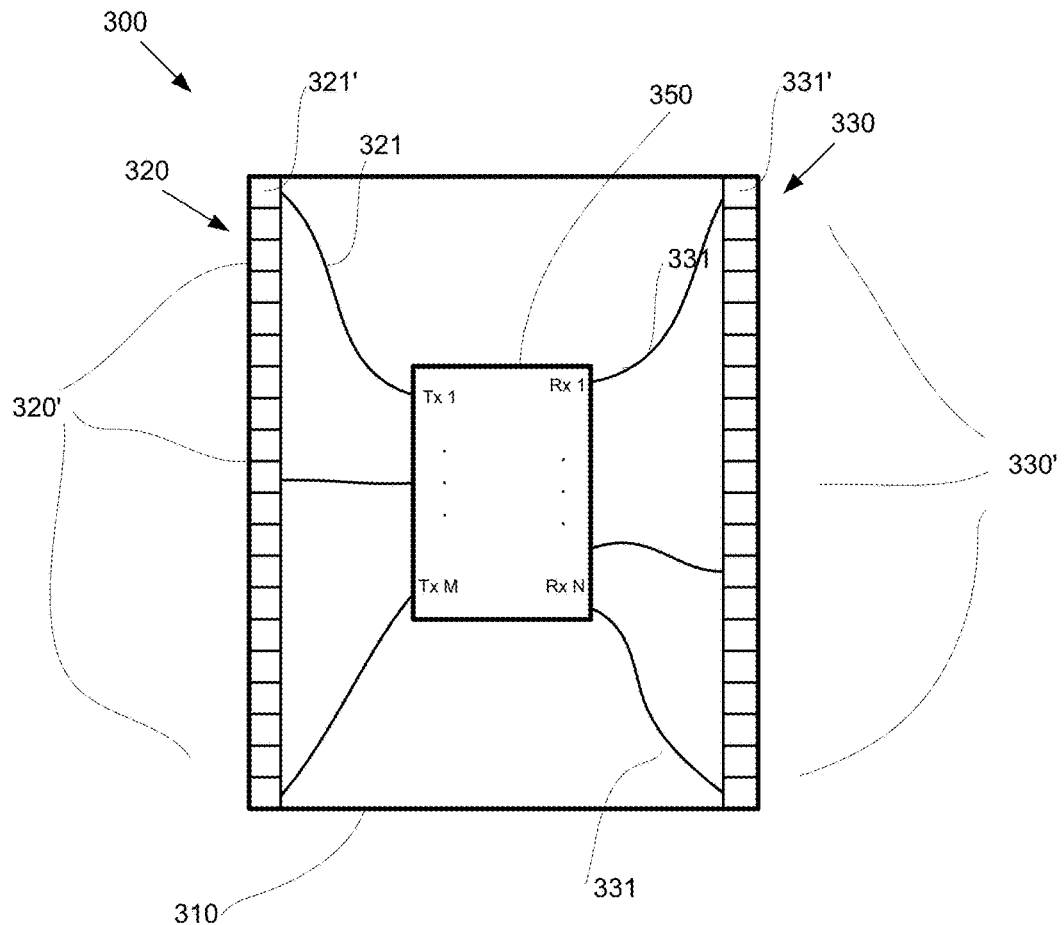
FIG. 3A shows a layout of a bi-static antenna array system implemented on a PCB, comprising an RFIC, antenna arrays and transmission lines, in accordance with embodiments.

FIG. 3A shows a layout of a bi-static antenna array system 300 implemented on a printed circuit board 310, in accordance with embodiments. The system 300 comprises an RFIC 350 configured to implement the bi-static array system 300 functions, e.g. transmit signals, receive signals, process signals and control the operation of the system, etc. In some embodiments, the system 300 comprises two antenna arrays, each comprising a plurality of antenna elements printed on the PCB 310. For example, the system 300 may comprise a transmit antenna array 320 comprising antenna elements 320' and a receive antenna array 330 comprising antenna elements 330'. In some embodiments, the transmit antenna array 320 and the receive antenna array 330 may be positioned, for example, on opposite sides of the PCB 310.

In accordance with embodiments, the RFIC 350 comprises M transmission channels including output ports Tx1 to TxM, where each port of the output ports Tx1 to TxM may be connected to one transmit antenna element of the transmit antenna array 320 via a transmission line. The RFIC further comprises N receive channels including input ports RX1 to RxN where each receives input port RX1 to RxN may be connected to one receive antenna element of the receive antenna array 330 via a transmission line. For example, output ports Tx1 may be connected to antenna element 321' via transmission line 321 and input port RX1 may be connected to antenna element 331' via transmission line 331.

Figure 3B:
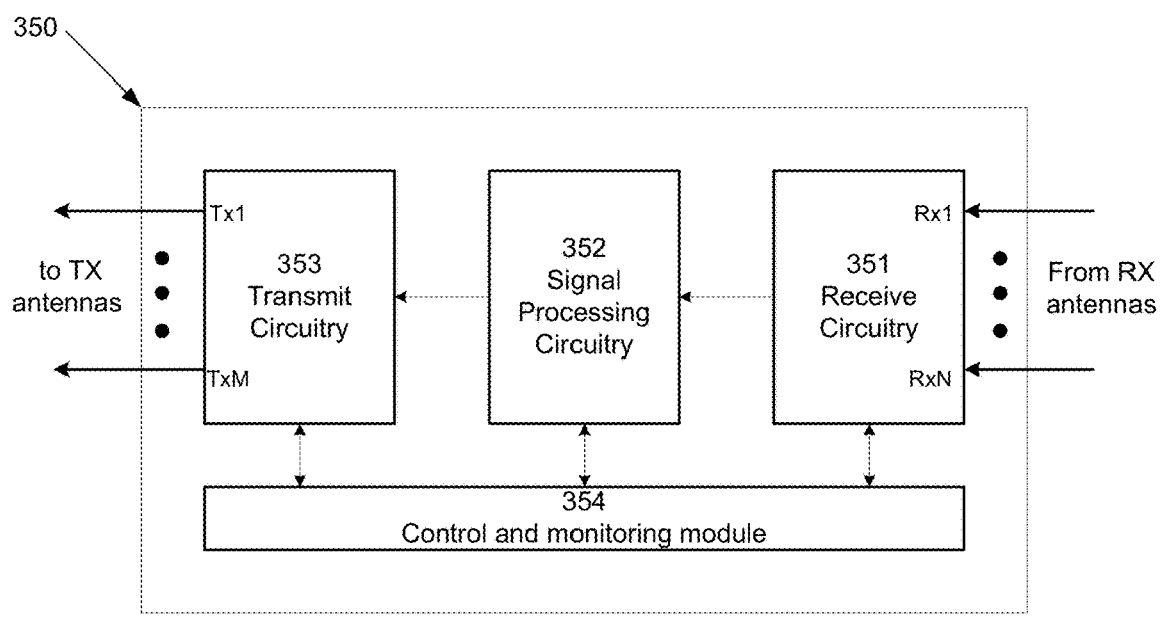
FIG. 3B shows a functional block diagram of an RFIC implementing the transmit and receive circuitry of an antenna array system, in accordance with embodiments.

FIG. 3B shows schematically a functional block diagram of the RFIC 350 implementing a multi-channel transmit and receive circuitry, in accordance with embodiments. The RFIC 350 may comprise a receive circuitry 351, such as a multi-channel receive circuitry, a signal processing circuitry 352 and a transmit circuitry 353, such as a multi-channel transmit circuitry. A control module 354 may be in communication with the receive circuitry 351, the signal processing circuitry 352 and the transmit circuitry 353 and is configured to control and monitor the operation of these circuitries (e.g. 351, 352, 353).

In accordance with embodiments, the signal processing circuitry 352 generates the appropriate encoding of signals to be transmitted, the appropriate decoding of the received signals, and all further processing functions, including for example delay measurement and computation of compensation values. The transmit circuitry 353 generates the required waveforms at the appropriate RF frequency and interfaces with the transmit antennas while the reverse functions are performed by the receive circuitry 351 which interfaces with the receive antennas.

In accordance with embodiments, the number of channels of system 300 can vary, for example, from a few channels e.g. 3 to high numbers e.g. 100 or more. In some embodiments, the number of transmit channels differs from the number of receive channels, while in other cases it is equal. The RF frequency of the transmitted and received signals can be in the low GHz, e.g. 3-10 GHz but also much higher, e.g. 30-100 GHz.

In accordance with some embodiments, a bi-static antenna array system, such as system 300 may be implemented on a PCB, and the antenna elements printed on the PCB and connected to the RFIC via traces implementing printed circuit transmission lines, for example, microstrip or stripline or coplanar waveguide transmission lines, or other known in the art transmission line technologies.

Figure 4A:
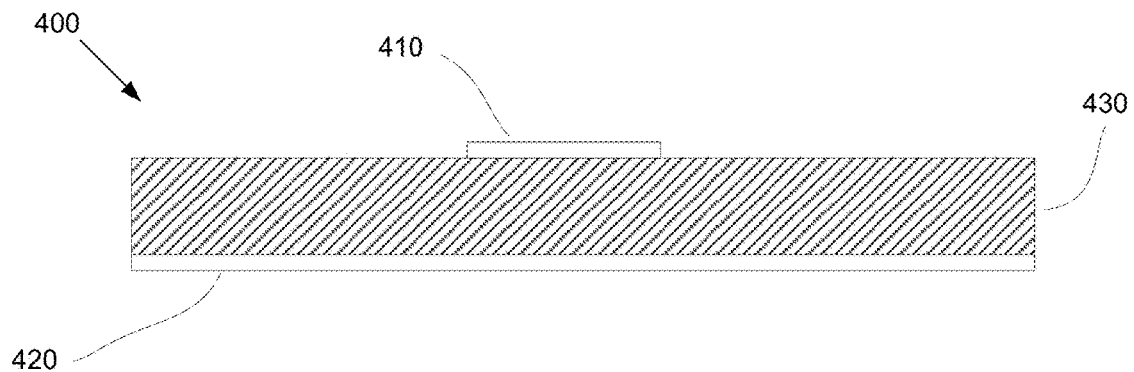
FIG. 4A shows a cross-sectional view of microstrip transmission line (single ground plane), in accordance with embodiments.
Figure 4B:
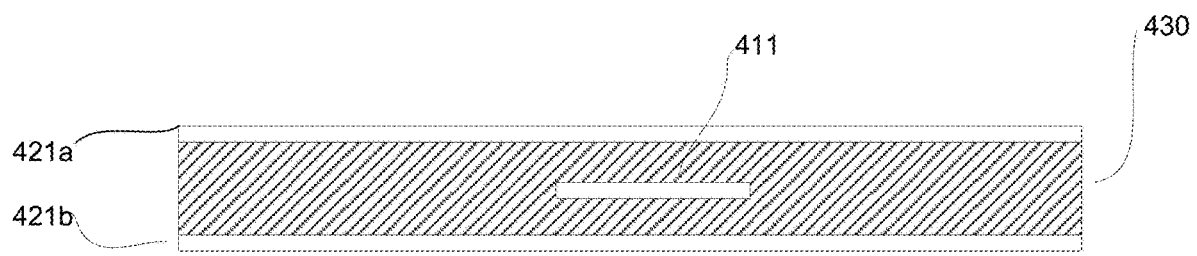
FIG. 4B shows a cross-sectional view of a stripline transmission line (dual ground planes), in accordance with embodiments.
Figure 4C:
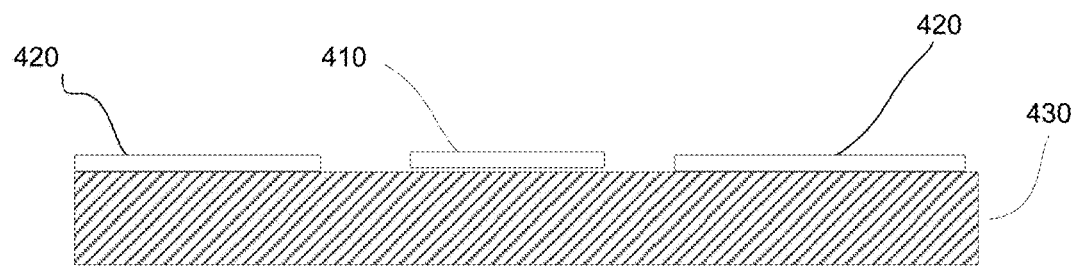
FIG. 4C shows a cross-sectional view of a coplanar waveguide transmission line, in accordance with embodiments.

FIGS. 4A-4C show schematically examples of printed circuit transmission lines technologies, in accordance with embodiments. The term 'microstrip' as used herein is defined as a type of electrical transmission line which can be fabricated using printed circuit board technology, and is used to convey microwave-frequency signals. It may include a conducting strip separated from a ground plane by a dielectric layer known as a substrate.

FIG. 4A shows a cross-sectional view of a PCB 400 where a trace 410 is printed on the top (or bottom) layer of a PCB 400 and the PCB dielectric material is sandwiched between the trace 410 and a ground plane 420, in accordance with embodiments.

The term 'stripline' as used herein is defined as a transverse electromagnetic (TEM) transmission line medium. A stripline circuit uses a flat strip of metal which is sandwiched between two parallel ground planes. The insulating material of the substrate forms a dielectric layer. The width of the strip, the thickness of the substrate and the relative permittivity of the substrate determine the characteristic impedance of the strip which is a transmission line. This stripline is shown in FIG. 4B illustrating a trace 411 sandwiched between two ground planes 421a and 421b and surrounded by the PCB dielectric material 430.

FIG. 4C shows a cross-sectional view of a coplanar waveguide (CPW), in accordance with embodiments. In this structure the signal line 410 and the ground conductors 420 are all situated on the same metal layer of the printed circuit.

In the CPW the fields are primarily confined to the gap between the signal line 410 and the ground plane conductors 420. Practically, the CPW structure is supported by the dielectric structure of the printed circuit.

In a bi-static antenna array system there are two separate antenna arrays, one for transmit and one for receive. In one embodiment the arrays form linear arrays located at different edges of the printed circuit board. A certain separation between the arrays is maintained to reduce the direct electromagnetic coupling between them. In an embodiment, the antenna arrays are composed on multiple linear subarrays. In an embodiment, the arrays are placed at opposite edges of the PCB, while in other embodiments they may be placed at perpendicular edges. Other array shapes are possible such as "zigzag" arrays, pseudorandom arrays, etc. The decision placement should be implemented is derived by design and layout constraints.

In accordance with amendments, the antenna elements are printed on the PCB and implemented by technologies such as patches, inverted-F, folded inverted, conformal, etc.

Each antenna element is connected to a port of the RFIC, either to a transmit port or receive port. The transmission lines differ in length due to the geometry of the board. The resulting delay (phase) difference between the transmission lines associated with each antenna due to trace length difference is compensated at the processing of the received signals to achieve accurate beamforming results.

Transmission Line Delay and Electrical Length

The delay incurred by a signal propagating on a transmission line such as 321 or 331 of physical length $L_{Physical}$ is:

$$\text{delay} = \frac{L_{Physical}}{v_\varepsilon} = \frac{L_{Electrical}}{c} \tag{6}$$

where $v_\varepsilon$ is the propagation velocity in the transmission line, dependent on $\varepsilon$, which is the effective dielectric constant of the PCB material for a given transmission line geometry, and c is the speed of light. Since $v_\varepsilon = c/\sqrt{\varepsilon}$, the electrical length is: $L_{Electrical} = \sqrt{\varepsilon} L_{Physical}$, and the change of electrical length $\Delta L_{Electric}$ due to a small change $\Delta\varepsilon$ of the dielectric constant ($\varepsilon' = \varepsilon + \Delta\varepsilon$) is (to first order):

$$\Delta L_{Electrical} = \tag{7}$$
$$\sqrt{\varepsilon + \Delta\varepsilon}\, L_{Physical} - \sqrt{\varepsilon}\, L_{Physical} \cong \frac{\Delta\varepsilon}{2\sqrt{\varepsilon}} L_{Physical} = \frac{1}{2}\frac{\Delta\varepsilon}{\varepsilon} L_{Electrical}$$

The following example illustrates that a large change in electrical length can occur due to a small variation in the dielectric constant. Assuming a transmission line of physical length $L_{Physical}$=4 cm, dielectric constant $\varepsilon$=4 and a change $\Delta\varepsilon/\varepsilon$ of 5%, the change in electrical length $\Delta L_{Electrical}$ is 0.2 cm. For a signal of 30 GHz (wavelength $\lambda$=1 cm) this change is of 0.2 wavelengths (72 degrees of phase shift) resulting in an almost full de-coherency between signals. Thus appropriate correction/calibration is required for proper operation.

In accordance with embodiments, to facilitate calibration, there are provided for each system, a dedicated calibration transmission line of known physical length, a dedicated transmitter and a dedicated receiver.

Figure 5A:
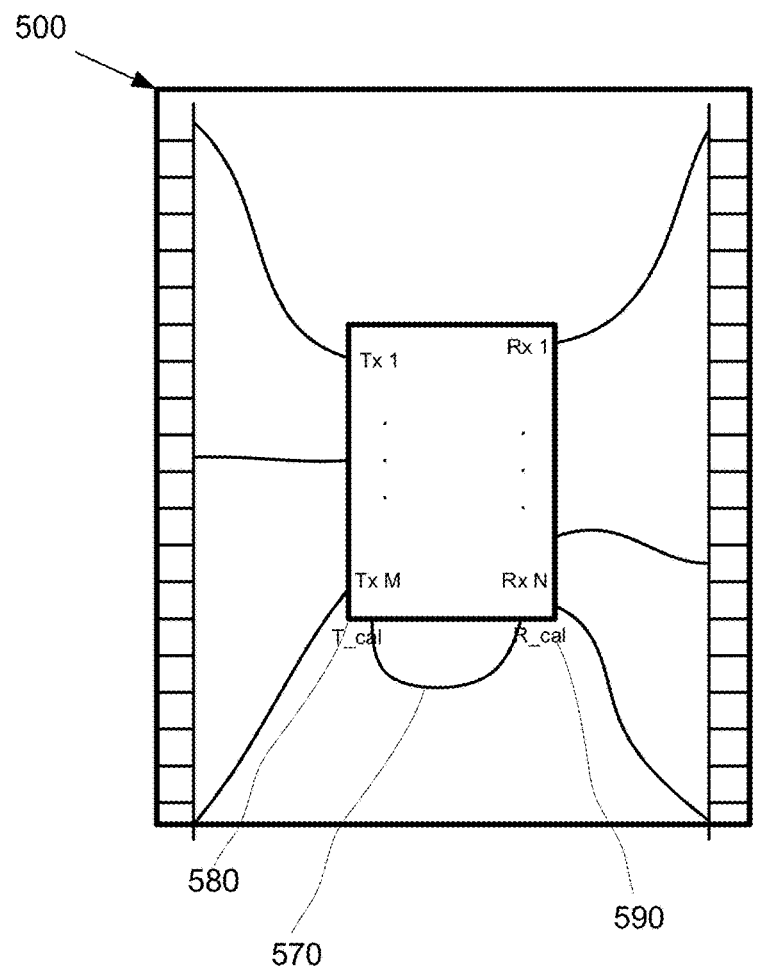
FIG. 5A shows the bi-static antenna array system of FIG. 3A comprising a dedicated calibration transmission line, in accordance with embodiments.
Figure 5B:
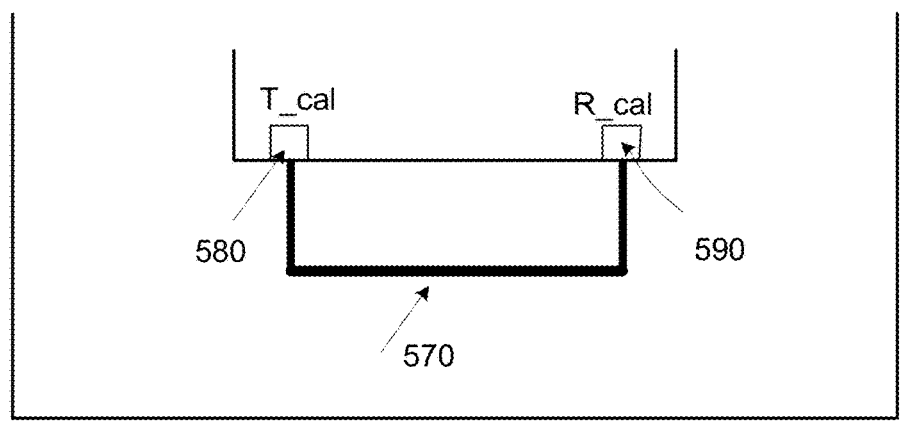
FIG. 5B shows a connection of the dedicated calibration transmission line of FIG. 5a, in accordance with embodiments.

FIGS. 5A and 5B show, respectively, a bi-static multi-antenna array system layout 500, which includes all the elements shown in FIG. 3A, but further comprising a dedicated calibration transmission line 570, a dedicated transmitter T_cal 580 and a dedicated receiver R_cal 590, in accordance with embodiments. In some cases, the dedicated calibration transmission line 570 is connected at one side to the output port of the transmitter T_cal 580 and its other side is connected to the input port of the receiver R_cal 590. The transmitter T_cal 580 is configured to transmit a signal such as a wideband signal. This signal is received by receiver R_cal and the propagation delay is evaluated, in accordance with embodiments. Alternatively, a pulse signal can be used to find the corresponding propagation delay. This measurement may be performed on the reference system and on each system in production.

It is noted that the transmitted signal bandwidth should be wide enough to provide the required resolution. Since the requirement is to find accurately the peak location, super resolution search methods can be used to estimate the peak location at higher accuracy than that dictated by the bandwidth. Exact value of the accuracy depends on the signal to noise ratio, but accuracy of 1/20 of bandwidth can be assumed.

Transmission Line Measurement and Calibration

Let $\Delta\varepsilon_x=\varepsilon_x-\varepsilon_{ref}$ be a small change, for example 1-5%, in the effective dielectric constant of the production system "x" with respect to a reference system. For this small change, the change of the electrical length of a calibration transmission line of system "x", $L_{Electrical}(x_{cal})$ from the electrical length of the calibration transmission line of a reference system $L_{Electrical}(ref_{cal})$ is approximately (to first order):

$$\Delta L_{Electrical}(x_{cal}) = \qquad (8)$$

$$L_{Electrical}(x_{cal}) - L_{Electrical}(ref_{cal}) = \frac{\Delta\varepsilon_x}{2\sqrt{\varepsilon_{ref}}} L_{Physical}(cal)$$

The change $\Delta L_{Electrical}(x_{cal})$ can be evaluated from the delay change $\Delta delay(x_{cal})$ between the measured delay through the calibration transmission line delay($x_{cal}$) of the production system "x", and the known delay through the calibration transmission line of the reference system delay (ref$_{cal}$), i.e.

$$\Delta delay(x_{cal})=delay(x_{cal})-delay(ref_{cal}) \qquad (9)$$

and $$\Delta L_{Electrical}(x_{cal})=c*\Delta delay(x_{cal}) \qquad (10)$$

The change in electrical length for each transmit-receive transmission line pair (i,j) of the production system "x" from the reference system is related to the delay change $\Delta delay$ ($x_{cal}$) by the following equation (11):

$$\Delta(L_{Electrical}(x_i) + L_{Electrical}(x_j)) = \qquad (11)$$

$$\frac{\Delta L_{Electrical}(x_{cal})}{L_{Physical}(cal)}(L_{Physical}(i) + L_{Physical}(j)) =$$

$$c*\Delta delay(x_{cal})\frac{L_{Physical}(i) + L_{Physical}(j)}{L_{Physical}(cal)}$$

where $L_{Electrical}(x_i)$ and $L_{Physical}(i)$) are the electrical and physical length of the transmission line from transmitter i to antenna i respectively and where $L_{Electrical}(x_j)$ and $L_{Physical}(j)$ are the electrical and physical length of the transmission line from antenna j to receiver j respectively.

It should be noted that all systems in production are identical and the ratio of the physical length of the various transmission lines with respect to the dedicated calibration transmission line is known based on the PCB layout design. The change in electrical length results in a delay change is as follows:

$$\Delta\tau(i, j) = \frac{1}{c}\Delta(L_{Electrical}(x_i) + L_{Electrical}(x_j)) = \qquad (12)$$

$$\Delta delay(x_{cal})\frac{L_{Physical}(i) + L_{Physical}(j)}{L_{Physical}(cal)}$$

or equivalently to a signal phase shift of:

$$\phi(i, j) = \frac{2\pi}{\lambda}\Delta(L_{Electrical}(x_i) + L_{Electrical}(x_j)) = \qquad (13)$$

$$2\pi f*\Delta delay(x_{cal})\frac{L_{Physical}(i) + L_{Physical}(j)}{L_{Physical}(cal)}$$

Thus, either delay compensation or phase compensation can be applied during the processing of the received signals, e.g. according to the specific implementation.

Figure 6:
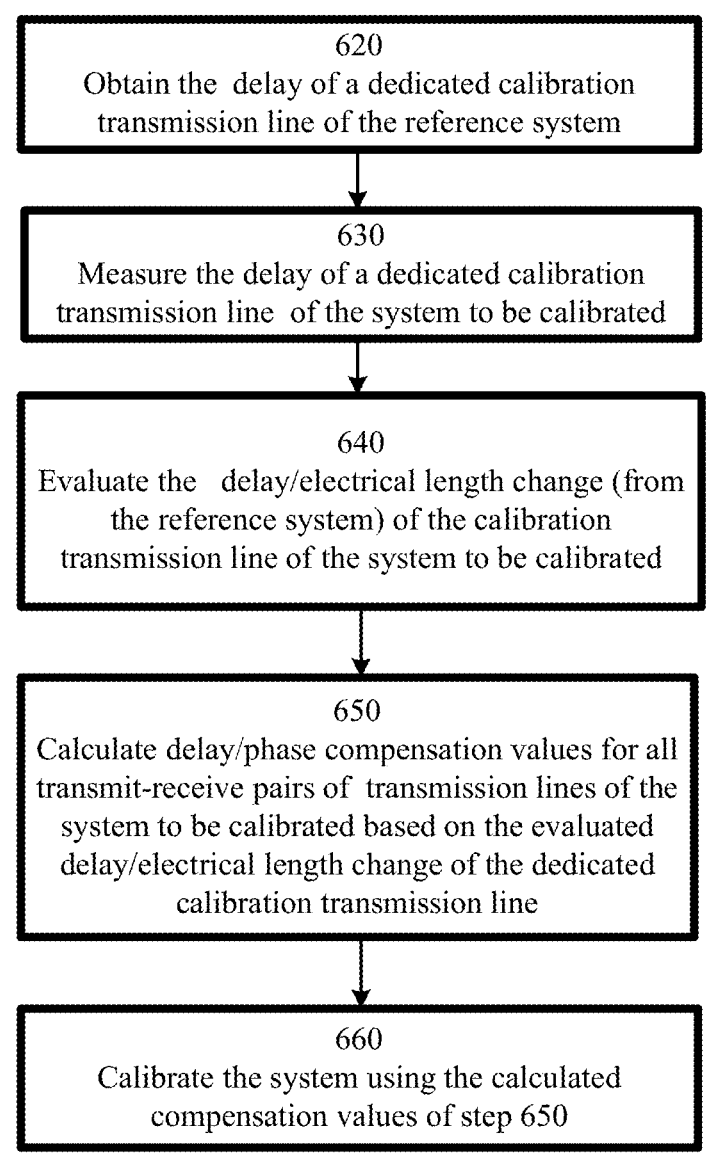
FIG. 6 shows a flow chart of a calibration method, in accordance with embodiments.

FIG. 6 shows a flowchart of a method 600 for calibrating an antenna array system such as a bi-static antenna array system, in accordance with embodiments. Generally, method 600 comprises calibrating the bi-static antenna array system by compensating the electrical length changes of the transmission lines of the bi-static antenna array system. The electrical length changes may be for example due to changes in the effective dielectric constant.

At step 620 the value of the delay through a dedicated calibration transmission line of a reference system delay (ref$_{cal}$) is obtained, in accordance with embodiments. In some cases, the delay is measured by transmitting one or more signals via this calibration transmission line and recording the resulting delay value.

At step 630 the delay through the dedicated calibration transmission line of each system, e.g. each system "x" in production, delay($x_{cal}$) is measured, in accordance with embodiments. In some cases, the measurement is performed by transmitting one or more signals through this calibration transmission line and recording the resulting delay value.

At step 640 the change (from the reference system) in delay $\Delta delay(x_{cal})$ and/or in electrical length $\Delta L_{Electrical}$ ($x_{cal}$) of the calibration transmission line for each system, e.g. system "x" in production, due to changes in PCB dielectric material is evaluated according to the following equations:

$$\Delta delay(x_{cal})=delay(x_{cal})-delay(ref_{cal}) \qquad (14)$$

$$\Delta L_{Electrical}(x_{cal})=c*\Delta delay(x_{cal}) \qquad (15)$$

where c is the speed of light 3*10$^8$ m/s

At step 650 the compensation values used for canceling the incurring electrical length change of each pair (i,j) of transmit-receive transmission lines of each system, e.g. of each system "x" in production, is calculated, based on the evaluated delay change $\Delta delay(x_{cal})$, or based on the evaluated electrical length of the dedicated calibration transmission line $\Delta L_{Electrical}(x_{cal})$. The compensation values are: compensation delays:

$$\Delta \tau(i, j) = \Delta delay(x_{cal}) * \frac{L_{Physical}(i) + L_{Physical}(j)}{L_{Physical}(cal)} \quad (16a)$$

$$\Delta \tau(i, j) = \frac{\Delta L_{Electrical}(x_{cal})}{c} * \frac{L_{Physical}(i) + L_{Physical}(j)}{L_{Physical}(cal)} \quad (16b)$$

or
compensation phases $$\Delta \phi(i, j) = 2\pi f * \Delta delay(x_{cal}) * \frac{L_{Physical}(i) + L_{Physical}(j)}{L_{Physical}(cal)} \quad (17a)$$

$$\Delta \phi(i, j) = \frac{2\pi}{\lambda} * \Delta L_{Electrical}(x_{cal}) * \frac{L_{Physical}(i) + L_{Physical}(j)}{L_{Physical}(cal)} \quad (17b)$$

At step 660 each system (e.g. each system "x" in production) is calibrated using the calculated compensation values of step 650.

In some embodiments, steps 630, 640, 650, 660 of FIG. 6 can be repeated while the system is in service (e.g. operational in the field), as part of a built-in test to compensate for potential changes of the dielectric material properties (i.e. effective dielectric constant) due to temperature, humidity, aging, etc.

In some embodiments, the delay measurement of the dedicated calibration transmission line as described above includes also the internal RFIC delay (in addition to the propagation delay through the transmission line itself). In other embodiments, the effect of this internal delay can be removed by internally coupling the transmit 580 and receive 590 calibration ports (i.e. on-chip coupling) and performing a delay measurement between the two internally coupled ports. By subtracting this measurement from the overall delay measurement, the net delay through the calibration transmission line (i.e. dependent only on its length on the PCB) is obtained.

Figure 7:
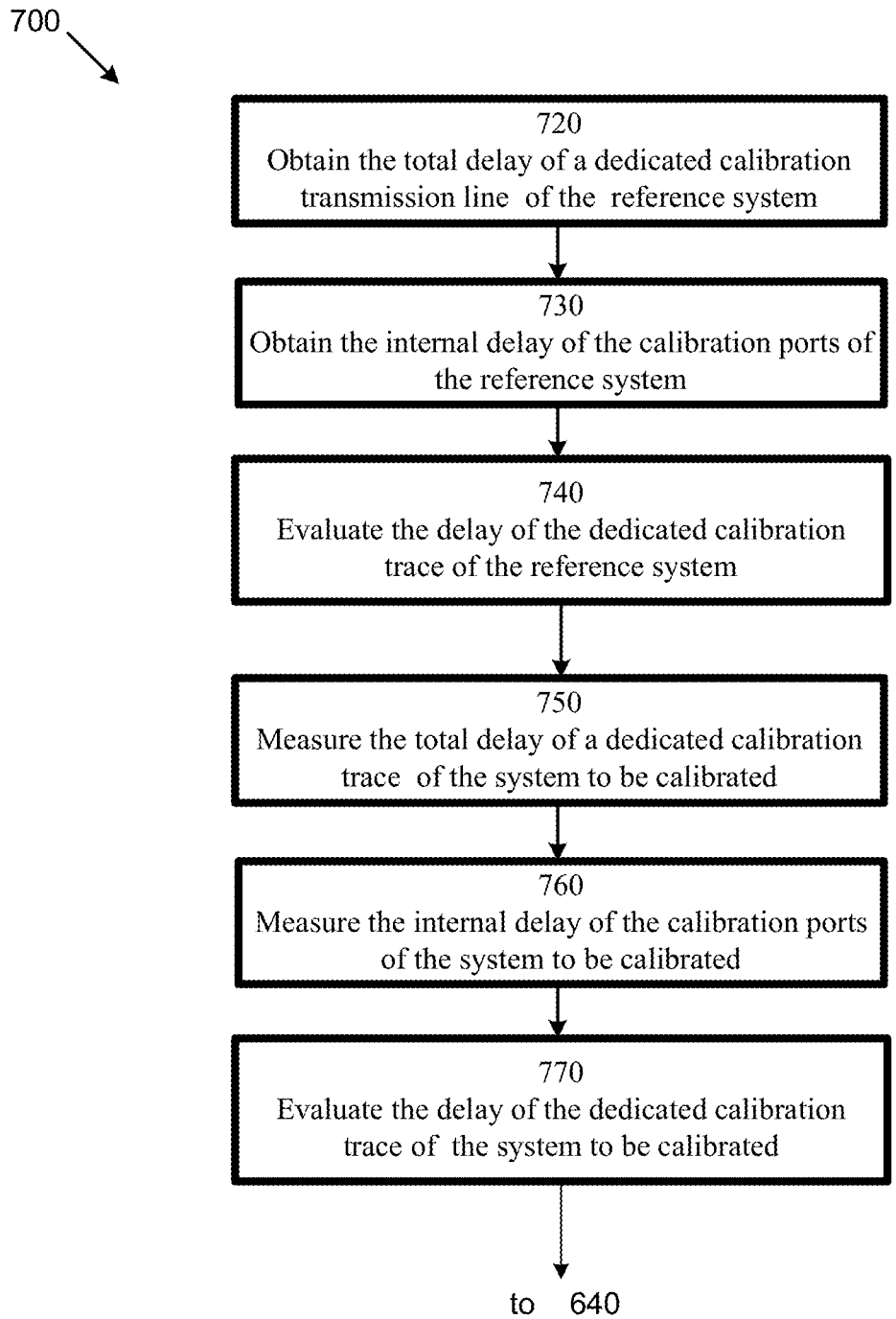
FIG. 7 shows a flow chart of a calibration method including a step for removing an effect of internal delay of the calibration ports, in accordance with embodiments.

FIG. 7 shows a flowchart of a method 700 for implementing the removal of the internal delay effect on the measurement of the calibration transmission line delay. In particular, steps 620 and 630 of FIG. 6 are replaced by steps 720, 730, 740, 750, 760, 770.

At step 720 the total delay through the dedicated calibration transmission line of the reference system tot_delay (ref$_{cal}$) is obtained. This value includes the internal delay through the transmit and receive calibration ports in_delay (ref$_{cal}$) in addition to delay(ref$_{cal}$), the propagation delay through the calibration transmission line itself:

$$\text{tot\_delay}(\text{ref}_{cal}) = \text{delay}(\text{ref}_{cal}) + \text{in\_delay}(\text{ref}_{cal}) \quad (18)$$

In some cases, this delay is measured by transmitting one or more signals via this transmission line and recording the measured delay value.

At step 730 the internal delay in_delay(ref$_{cal}$) is obtained. In some cases, the calibration transmit port of the reference system is internally (on-chip) coupled to the calibration receive port and the internal delay in_delay(ref$_{cal}$) in measured by transmitting one or more signals via the coupled calibration ports and recording the measured delay value.

At step 740, the dedicated calibration transmission line delay, elay(ref$_{cal}$), is obtained from the values of steps 720 and 730:

$$\text{delay}(\text{ref}_{cal}) = \text{tot\_delay}(\text{ref}_{cal}) - \text{in\_delay}(\text{ref}_{cal}) \quad (19)$$

At step 750 the total delay through the dedicated calibration transmission line of each system (e.g. each system "x" in production) tot_delay(x$_{cal}$) is measured, by transmitting one or more signals via this transmission line and recording the measured delay value. The measurement includes the internal delay value through the transmit and receive calibration ports in_delay(x$_{cal}$) in addition to delay(x$_{cal}$), the propagation delay through the calibration transmission line itself:

$$\text{tot\_delay}(x_{cal}) = \text{delay}(x_{cal}) + \text{in\_delay}(x_{cal}) \quad (20)$$

At step 760 the calibration transmit port of the reference system is internally (on-chip) coupled to the calibration receive port and the internal delay in_delay(x$_{cal}$) in measured by transmitting one or more signals via the coupled calibration ports and recording the measured delay value.

In some cases, the internal delay value is identical for all systems in production, thus in_delay(x$_{cal}$)=in_delay(ref$_{cal}$) and the measurement of step 760 is not required.

At step 770, the calibration transmission line delay delay (x$_{cal}$) is evaluated using the measurements of steps 750 and 760:

$$\text{delay}(x_{cal}) = \text{tot\_delay}(x_{cal}) - \text{in\_delay}(x_{cal}) \quad (21)$$

In other embodiments, the methods of the present invention may be used to calibrate changes in the electrical length of transmission lines due to changes in material effective dielectric constant in general antenna array systems, for example, in monostatic antenna array systems. Specifically, in such antenna systems the same antenna elements which are used for transmitting and receiving, can be calibrated using the methods 600 or 700 in accordance with embodiments as follows: the delay of a dedicated calibration transmission line is measured for a reference system and for each system to be calibrated using dedicated on-chip transmitter and receiver; the change in this delay measurement is further used to modify the electrical length of all transmission lines of the system to be calibrated from the values of the reference system.

It is stressed that the present invention is described herein in the context of antenna arrays, however, it is should be clear to those skilled in the art that the invention is also applicable to any system in which signals need to be distributed in a phase-balanced way through multiple transmission lines of non-equal length. It is further clear that the calculations described herein can be performed by multiple variants of computational means.

In further embodiments, the system disclosed here includes a processing unit which may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, notepad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object-oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that elements. It is to be understood that where the specification states that a component, feature, structure, or characteristic "may", "might", "can" or "could" be included, that particular component, feature, structure, or characteristic is not required to be included. Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. Methods of the present invention may be implemented by performing or completing manually, automatically, or a combination thereof, selected steps or tasks.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. An antenna array system comprising:
   a plurality of transmission lines;
   a plurality of transmitters;
   a plurality of transmit antenna elements, wherein each antenna element of said plurality of transmit antenna elements is connected, respectively, via one transmission line of said plurality of transmission lines to one of said plurality of transmitters;
   a plurality of receivers;
   a plurality of receive antenna elements, wherein each receive antenna element of said receive antenna elements is connected, respectively, via one transmission line of said plurality of transmission lines to one receiver of said plurality of receivers;
   at least one dedicated transmitter connected to at least one dedicated receiver via a dedicated calibration transmission line; and
   at least one processor in communication with said plurality of transmitters and with said plurality of receivers said processor is configured to:
   obtain a delay value of a dedicated calibration transmission line of a reference antenna array system;
   measure the delay value of the dedicated calibration transmission line of the antenna array system;
   evaluate a delay change value $\Delta\text{delay}(x_{cal})$ by subtracting the delay value of the dedicated calibration transmission line of the reference antenna array system from the delay of the dedicated calibration transmission line of the antenna array system;
   calculate compensation values for cancelling the incurring electrical length change of each pair (i,j) of transmit-receive transmission lines of the antenna array system wherein the calculation is based on the evaluated delay change $\Delta\text{delay}(x_{cal})$; and
   calibrate the antenna array system using the calculated compensation values.

2. The system of claim 1 wherein said compensation values comprise compensation phases.

3. The system of claim 1 wherein said compensation values comprise compensation delays.

4. The system of claim 1 wherein the delay change value $\Delta\text{delay}(x_{cal})$ of the dedicated transmission line is represented as a change in electrical length of the dedicated calibration transmission line $\Delta L_{Electrical}(x_{cal})$ of the antenna array system.

5. The system of claim 1 wherein the calculation of the compensation values is based on the electrical length change of the dedicated calibration transmission line $\Delta L_{Electrical}(x_{cal})$ of the antenna array system.

6. The system of claim 1 wherein said plurality of transmission lines are printed traces on a printed circuit board (PCB).

7. The system of claim 6 wherein said plurality of transmission lines are selected from the group consisting of: microstrips, striplines, coplanar waveguides.

8. The system of claim 1 wherein the delay value of said dedicated calibration transmission line is measured by processing a signal received at said at least one dedicated receiver, wherein said signal is transmitted by said at least one dedicated transmitter.

9. The system of claim 8 wherein said signal is a wideband signal.

10. The system of claim 8 wherein said signal is a short pulse signal.

11. The system of claim 1 wherein the antenna array system is a bi-static multi-antenna array system.

12. A method for calibrating an antenna array system using a reference antenna array system, the antenna array system comprising:
    a plurality of transmission lines;
    a plurality of transmitters;
    a plurality of transmit antenna elements, wherein each antenna element of said plurality of transmit antenna elements is connected, respectively, via one transmission line of said plurality of transmission lines to one transmitter of said plurality of transmitters;
    a plurality of receivers;
    a plurality of receive antenna elements, wherein each antenna element of said receive antenna elements is connected, respectively, via one transmission line of said plurality of transmission lines to one receiver of said plurality of receivers; and
    at least one dedicated transmitter connected to at least one dedicated receiver via a dedicated calibration transmission line;
    the method comprising:
    obtaining a delay value of a dedicated calibration transmission line of the reference antenna array system;
    measuring the delay value of the dedicated calibration transmission line of the antenna array system;
    evaluating a delay change value $\Delta\text{delay}(x_{cal})$ of the dedicated calibration transmission line by subtracting the delay value of the dedicated calibration transmission line of the reference antenna array system from the delay value of the dedicated calibration transmission line of the antenna array system;
    calculating compensation values for cancelling the incurring electrical length change of each pair (i,j) of transmit-receive transmission lines of the antenna array system wherein the calculation is based on the evaluated delay change of the dedicated calibration transmission line $\Delta\text{delay}(x_{cal})$; and
    calibrating the antenna array system using the calculated compensation values.

13. The method of claim 12 wherein said compensation values comprise compensation phases.

14. The method of claim 12 wherein said compensation values consists of compensation delays.

15. The method of claim 12 wherein the delay change of the dedicated transmission line is represented as a change in electrical length of the dedicated calibration transmission line $\Delta L_{Electrical}(x_{cal})$.

16. The method of claim 12 wherein the calculation of the compensation values is based on the electrical length change of the dedicated calibration transmission line $\Delta L_{Electrical}(x_{cal})$.

* * * * *